US005330694A

United States Patent [19]

Iwaya

[11] Patent Number: 5,330,694

[45] Date of Patent: Jul. 19, 1994

[54] METHOD OF PATTERNING A CONCRETE SURFACE

[75] Inventor: Nobuo Iwaya, Komaki, Japan

[73] Assignee: Tokai Rubber Industries, Ltd., Komaki, Japan

[21] Appl. No.: 991,212

[22] Filed: Dec. 15, 1992

[30] Foreign Application Priority Data

Dec. 17, 1991 [JP] Japan .................................. 3-353727

[51] Int. Cl.[5] .......................... B28B 1/16; B28B 7/36; B32B 3/26; B32B 31/12

[52] U.S. Cl. .................................... 264/112; 156/155; 156/232; 156/236; 156/245; 156/247; 156/344; 264/122; 264/128; 264/131; 264/133; 264/135; 264/256; 264/317; 264/333; 264/338

[58] Field of Search .................... 264/333, 256, 69, 71, 264/131, 139, 135, 133, 112, 122, 128, 219, 221, 245, 317, 334, 338; 156/155, 232, 236, 245, 247, 344

[56] References Cited

U.S. PATENT DOCUMENTS

| | | | |
|---|---|---|---|
| 985,353 | 2/1911 | Landis | 249/140 |
| 2,296,453 | 9/1942 | Saffert | 264/69 X |
| 3,097,080 | 7/1963 | Weir | 264/256 X |
| 3,378,617 | 4/1968 | Elmendorf | 264/256 X |
| 3,390,496 | 4/1968 | Weiner et al. | 264/256 X |
| 3,441,457 | 4/1969 | Regnaud | 156/232 X |
| 3,737,511 | 6/1973 | Dillon | 264/256 |
| 4,146,599 | 3/1979 | Lanzetta | 264/256 X |
| 4,213,926 | 7/1980 | Toyoda et al. | 264/256 X |
| 4,784,821 | 11/1988 | Leopold | 264/256 X |
| 4,915,888 | 4/1990 | Sato | 264/233 X |

FOREIGN PATENT DOCUMENTS

| | | | |
|---|---|---|---|
| 2347876 | 4/1975 | Fed. Rep. of Germany | 264/256 |
| 317703 | 12/1989 | Japan | 264/69 |
| 192908 | 7/1990 | Japan | 264/256 |
| 10806 | 1/1991 | Japan | 264/333 |

*Primary Examiner*—Karen Aftergut
*Attorney, Agent, or Firm*—Armstrong, Westerman, Hattori, McLeland & Naughton

[57] ABSTRACT

A method of patterning a concrete surface and a pattern transfer mat for use in the method. The pattern transfer mat has a transfer surface having three-dimensional irregularities and carrying a multiplicity of grains to be transferred to the substrate concrete. Concrete is cast against the transfer surface of the mat and cured in situ and the mat is then detached.

5 Claims, 2 Drawing Sheets

FIG.1
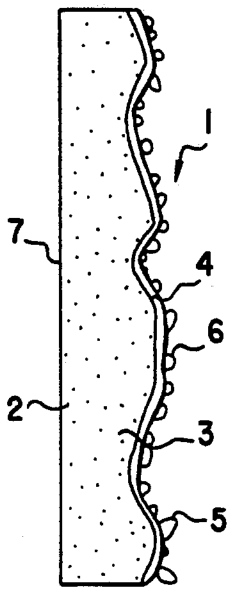
FIG.3
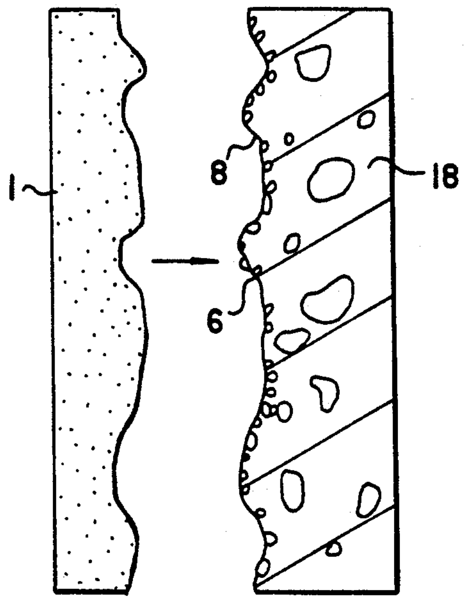
FIG.2
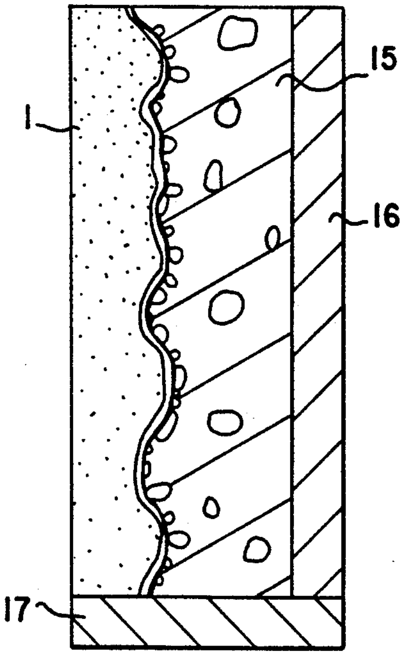
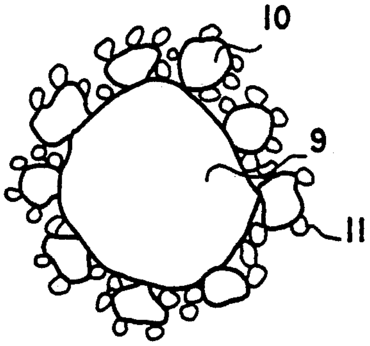
FIG.4

FIG.5
PRIOR ART
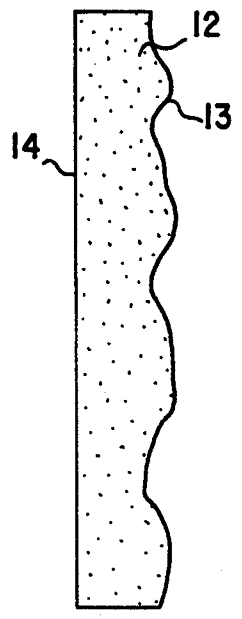
FIG.7
PRIOR ART
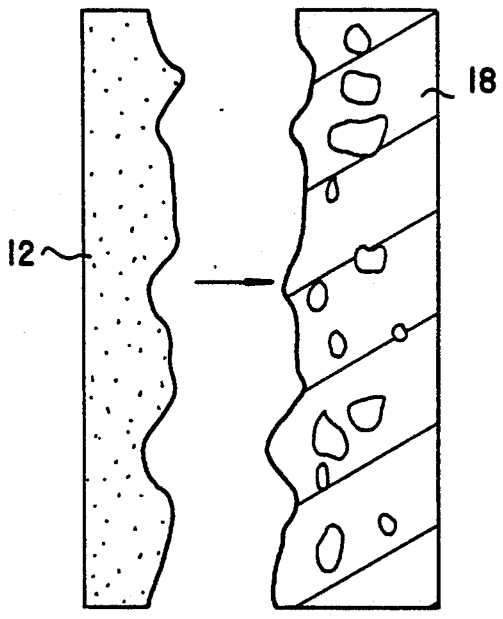
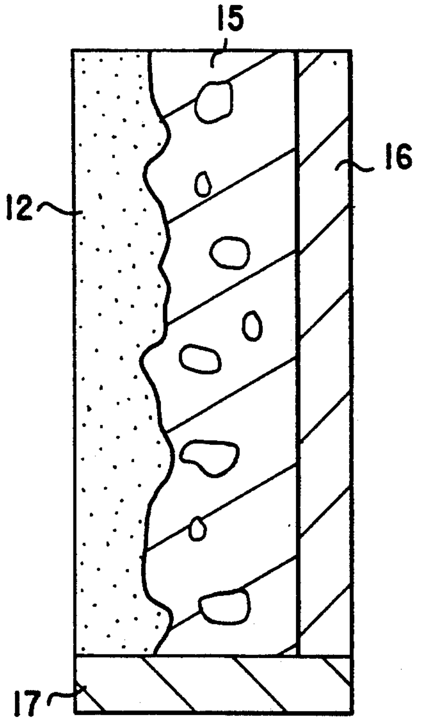
FIG.6
PRIOR ART

METHOD OF PATTERNING A CONCRETE SURFACE

FIELD OF THE INVENTION

The present invention relates to a method of patterning a concrete surface and to a pattern transfer mat for use in the method.

BACKGROUND OF THE INVENTION

Heretofore, the following procedure has been employed for producing an attractive three-dimensional pattern on a concrete surface. First, a rigid polyurethane mat (a pattern transfer mat) 12, such as the one illustrated in FIG. 5, is provided. This transfer mat 12 has an effective transfer surface 13 formed with an aesthetic three-dimensional pattern and a flat back surface 14. At the job site or in the field, a parting agent is applied to said transfer surface 13 and the mat 12 so treated is positioned at a given spacing from a casting form 16. Then, the side openings (not shown) and bottom opening between the form 16 and the mat 12 are closed with boards 17 and a concrete material 15 is poured from the top opening. The concrete material 15 is then allowed to cure and harden to give a concrete board or structure 18. As shown in FIG. 7, the mat 12 is then detached from the concrete 18. The surface of the concrete 18 thus obtained has the three-dimensional pattern of said mat 12 copied on its surface. Finally this sculptured concrete surface is finished, for example, by spraying with a suitable coating composition, to give a natural-looking surface.

However, since the coating material used in the above process is usually an organic composition and the organic coating film tends to discolor or fade or undergo degradation with time, the surface of the concrete cannot be as durable as the surface of, for example, a masonry of inorganic material (such as natural rock). Moreover, it is necessary to recoat the surface at certain intervals and the cost of maintenance including this "refreshing" work is substantial.

To overcome these disadvantages it has been proposed to employ a transfer mat carrying natural pebbles or glass fragments secured with a water-soluble adhesive, casting concrete against this transfer mat, removing the mat from the cured concrete to thereby leave said natural pebbles or the like embedded in the concrete and finally washing out the water-soluble adhesive (Japanese Patent Kokai Publication No. 56-169189/1981). However, this technology has the drawback that in casting concrete against the effective surface of the transfer mat, delicate air cells remain entrapped on the mat surface and produce pits or small cavities in the surface layer of the concrete, thus detracting from the finished appearance of the cast concrete. This drawback is particularly prominent when the transfer mat has an undulating or profiled surface.

OBJECT OF THE INVENTION

The object of the present invention is to provide a method of patterning a concrete surface, which is capable of producing an attractively colored, durable and natural-looking pattern or texture such as that of a masonry on a concrete surface, and to a pattern transfer mat for use in the method.

SUMMARY OF THE INVENTION

The above object is accomplished by the present invention. In a first aspect, the invention relates to a method of patterning a concrete surface which comprises preparing a pattern transfer mat releasably carrying a multiplicity of aesthetic grains as distributed on its surface (hereinafter referred to sometimes as the effective surface), casting a concrete material against the effective surface of said mat and detaching the mat from the cured concrete to thereby transfer and embed said aesthetic grains onto the concrete surface, said aesthetic grains being grains having a cement powder deposited thereon beforehand. In a second aspect, the invention relates to a pattern transfer mat releasably carrying aesthetic grains previously dusted with a cement powder as distributed in a predetermined pattern on its surface.

In accordance with the invention, a pattern transfer mat releasably carrying aesthetic grains pretreated with a cement powder as distributed on its surface is employed and a concrete material is cast against the effective or textured surface of the mat. Therefore, even if fine air cells are entrapped on the mat surface on casting the concrete, the cement particles deposited on the aesthetic grains absorb water to cause these fine air cells to collapse. Therefore, the finished surface of the cast concrete structure is made smooth. This smoothing effect is particularly pronounced when an undulation is to be reproduced on the concrete surface.

The present invention is now described in further detail.

In the present invention, a pattern transfer mat carrying aesthetic grains on which a cement powder, as well as a coloring matter if required, has been deposited as distributed on its undulating surface is employed to transfer the profiled pattern in a natural-looking manner to the surface of a cast concrete structure.

The aesthetic grains may for example be crushed natural rocks, ceramic grains, glass fragments and so on. It is particularly advantageous to use fragments of one or more species of colorful natural stones or rocks. The mean diameter (A) of such aesthetic grains is preferably not greater than 5 mm and the grain size distribution is preferably such that grains within the range of $0<A\leqq 0.5$ account for 70 to 30% (by weight; the same applies hereinafter), those in the range of $0.5<A\leqq 2.5$ mm account for 30 to 70%, and those in the range of $2.5<A\leqq 5$ mm account for 0 to 10%.

The cement powder which is deposited on said aesthetic grains is not critical in type. The mean particle diameter of the cement is generally not greater than 0.5 mm, preferably 1 to 10 μm and more desirably 2 to 5 μm. The cement powder may contain other hydroscopic inorganic materials such as gypsum. A powder in which such inorganic matter other than cement is predominant is also acceptable. The cement powder in the context of the invention includes such powders as well.

The method of depositing such a cement powder on the aesthetic grains is not critical, either. For example, one may slightly moisten the aesthetic grains beforehand and blend them with a cement powder or dust the aesthetic grains with the cement powder delivered from a nozzle means.

In addition to said deposition of cement particles, the aesthetic grains may be further treated with a coloring material as required for imparting a more natural-looking or aesthetic appearance to the finished concrete surface. The coloring material is preferably a durable inorganic material which is not liable to discolor, fade or degrade, for example metal oxides such as $Fe_2O_3$, $CrO_3$ and so on. The coloring matter is preferably used in a combination of three or more species so that a mottled color effect closely resembling a natural rock or the like can be reproduced on the concrete surface. The preferred mean particle diameter of said colorant is 0.5 to 1 μm.

The method of depositing a colorant on the aesthetic grains is not critical, either.

For example, the aesthetic grains may be given a surface static charge under high-speed rotation and the coloring matter be deposited on the charged surfaces.

The pattern transfer mat carrying said aesthetic grains can be made of a rigid polyurethane foam, for instance. Such a rigid urethane foam mat has a patterned transfer surface which comes into contact with the concrete material to reproduce the pattern on the concrete surface and a flat back surface. Such a pattern transfer mat is manufactured by pouring a liquid urethane foam molding composition into a metal mold having an internal surface pattern complementary with the pattern to be reproduced and allowing the composition to cure in the mold, and has a core layer of foamed resin and an undulating or profiled surface comprising a dense integral skin. This integral skin layer is substantially free of air cells, very dense and smooth. The above-mentioned undulation of the pattern transfer mat is formed on this smooth surface of the integral skin layer.

On this undulating or profiled surface of the pattern transfer mat are distributed said aesthetic grains on which said cement powder, as well as the colorant if required, has been deposited. Usually, the aesthetic grains are deposited through a binder or an adhesive. The binder or adhesive for this purpose is preferably one whose binding force is reduced or eliminated by the water, alkali and/or the like in concrete. As adhesives whose bonding force is reduced or eliminated by water in concrete, there can be mentioned methylcellulose and polyvinyl alcohol adhesives, water glass and so on. As adhesives or binders whose binding force is reduced or eliminated by alkali in concrete, there can be mentioned two-can type acrylic resin adhesives. The technology of distributing aesthetic grains through such a binder or adhesive on the pattern transfer mat includes a process which comprises spreading said aesthetic grains in accordance with a predetermined pattern on the mat and applying a solution of said binder over the mat in the form of a spray-mist or a process which comprises depositing a binder layer on the mat surface beforehand and distributing said colored grains in a predetermined pattern so that the grains may be locked in position by the binding force of the binder layer. This operation may be followed by pressing the mat so that the grains may be partially or completely embedded in the binder layer. It is also possible to use paraffin, clay, rubber or resin in lieu of said binder. In such cases, said aesthetic grains are first distributed in a predetermined pattern and, if necessary, are partially embedded. Where the effective surface of the pattern transfer mat has a binding property, it is not obligatory to employ said binder or the like.

In the present invention, using the above-described pattern transfer mat, a three-dimensional pattern resembling a natural masonry is reproduced on a concrete surface. Thus, a concrete material is cast against the effective surface of said pattern transfer mat and allowed to cure and, then, the mat is detached from the concrete surface. By this series of operations, the aesthetic grains on the pattern transfer mat are transferred and embedded onto the concrete surface so that the concrete surface is provided with the desired attractive three-dimensional pattern. When the binder used for fixing said aesthetic grains on the mat is one whose binding force is attenuated or eliminated by water or the like in concrete, detachment of the transfer mat from the concrete surface is facilitated because the binding force is reduced or eliminated by water or the like during the curing period. In this manner, the aesthetic grains are transferred and partially or completely embedded in the concrete to produce the desired three-dimensional pattern which may, for example, be quite alike a masonry of naturally-occurring stone or rock. Furthermore, the fine air cells which form on the concrete surface in casting are eliminated by the cement powder deposited on the aesthetic grains so that the concrete surface can be very satisfactory without pits due to such residual air cells.

BRIEF DESCRIPTION OF THE DRAWINGS

FIG. 1 is a schematic view showing a pattern transfer mat as an embodiment of the invention;

FIG. 2 is a schematic view showing a pattern transfer method using said pattern transfer mat;

FIG. 3 is a schematic view showing the step of parting the product concrete board;

FIG. 4 is a schematic view showing an exemplary aesthetic grain used in accordance with the invention;

FIG. 5 is a schematic view showing the conventional pattern transfer mat;

FIG. 6 is a schematic view showing the pattern transfer method using the above conventional pattern transfer mat; and FIG. 7 is a schematic view showing the step of parting the product concrete board.

DETAILED DESCRIPTION OF THE PREFERRED EMBODIMENTS

Example 1

Referring to FIG. 1 which shows a pattern transfer mat embodying the principles of the invention, the pattern transfer mat 1 is made of rigid polyurethane foam. Like the prior art mat, it consists of a foam core layer 2 and an integral skin layer 3. One surface 4 of this pattern transfer mat 1 is a smooth profiled surface, while the other surface is a flat back surface 7. The surface 4 is first coated with a water-soluble methylcellulose adhesive to deposit a binding layer with a thickness of 0.1–5 mm. To this binding layer, a multiplicity of colorful natural rock grains 6 previously dusted with a cement powder are bonded by a pressure-spray method. Using the above pattern transfer mat 1, a concrete material 15 is cast and allowed to cure in the per se routine manner as illustrated in FIG. 2. In FIG. 2, a frame is indicated by 16 and a board for closing the opening is indicated by 17. Then, as shown in FIG. 3, the pattern transfer mat 1 is detached from the concrete structure 18. Since the methylcellulose binding layer 5 has already dissolved into the water contained in the concrete material by this stage, the mat 1 can be easily detached. The resulting concrete structure has a marble-like colored surface pattern comprising said natural rock aesthetic grains 6 on the surface 8.

Example 2

Except that a two-can type acrylic adhesive is used in lieu of the methylcellulose adhesive, the procedure of Example 1 was otherwise repeated to fabricate a pattern transfer mat. Using this mat, a concrete structure is produced in the same manner as Example 1. The concrete structure has a marble-like colored surface texture comprising said natural rock grains.

Example 3

A pattern transfer mat was fabricated in the same manner as Example 1 except that grains prepared by depositing a cement powder 10 and, as a coloring matter, a $Fe_2O_3$ powder 11 having a mean particle diameter of 0.8 μm on natural rock grains 9 as shown in FIG. 4 were used as aesthetic grains 6. Using this pattern transfer mat, a concrete structure was produced. This concrete structure had a colorful three-dimensional surface texture comprising natural rock grains which closely resembles the surface of marble.

EFFECT OF THE INVENTION

As described above, the method of the present invention comprises preparing a pattern transfer mat carrying a multiplicity of aesthetic grains distributed in a predetermined pattern on its surface, casting concrete against the surface, and detaching said mat from cured concrete to thereby transfer and embed said aesthetic grains onto the concrete, said pattern transfer mat preferably having a profiled surface and said aesthetic grains having a cement powder and optionally a coloring matter deposited thereon beforehand. In the above arrangement, if delicate air cells remain on casting the concrete, the cement powder deposited on the aesthetic grains absorbs water to cause said delicate air cells to collapse. Therefore, the finished concrete surface is rendered smooth. This effect is particularly beneficial when a profiled surface is copied on the concrete. Furthermore, with the pattern transfer mat of the invention, the transfer of the desired pattern is facilitated. Moreover, when one or more colorants are previously deposited on the aesthetic grains, a natural-looking surface more closely resembling that of natural stone or rock may be reproduced.

What is claimed is:

1. A method of patterning a concrete surface which comprises the steps of:

preparing a pattern transfer mat releasably carrying a multiplicity of aesthetic grains on a surface of said pattern transfer mat, said surface of said pattern transfer mat having an undulating profile;

casting concrete against said surface of said pattern transfer mat curing said cast concrete, and detaching said pattern transfer mat from said cured concrete to transfer said aesthetic grains to a surface of said cured concrete and to embed said aesthetic grains in said surface of said cured concrete; and depositing a particulate cement powder on said aesthetic grains before said casting of said concrete against said pattern transfer mat such that said particulate cement powder absorbs water from said cast concrete causing fine air cells entrapped between said pattern transfer mat surface and said cast concrete to collapse to thus provide a smooth concrete surface.

2. A method of patterning a concrete surface according to claim 1 wherein said aesthetic grains are distributed and releasably secured on said surface of said pattern transfer mat through an adhesive layer whose binding force is reduced by constituents of said concrete.

3. A method of patterning a concrete surface according to claim 1 wherein said aesthetic grains have diameters not greater than 2.5 mm.

4. A method of patterning a concrete surface according to claim 1 wherein a powdery colorant is deposited on said aesthetic grains before said casting of said concrete against said surface of said pattern transfer mat.

5. A method of patterning a concrete surface according to claim 1 wherein said step of depositing occurs prior to said step of preparing.

* * * * *